United States Patent [19]

Abolins

[11] 4,339,140
[45] Jul. 13, 1982

[54] VEHICLE KING PIN ASSEMBLY
[75] Inventor: Andrew Abolins, Langhorne, Pa.
[73] Assignee: Strick Corporation, Ft. Washington, Pa.
[21] Appl. No.: 156,310
[22] Filed: Jun. 4, 1980
[51] Int. Cl.³ .............................................. B62D 53/08
[52] U.S. Cl. ............................. 280/433; 280/405 A; 280/415 A; 280/415 B; 280/438 R; 410/64
[58] Field of Search ............ 410/64; 280/433, 415 A, 280/415 B, 438 R, 405 A, 407

[56] References Cited

U.S. PATENT DOCUMENTS

| 2,494,799 | 1/1950 | Duvall et al. | 260/433 |
| 2,831,704 | 4/1958 | Tenenbaum | 280/433 X |
| 2,867,450 | 1/1959 | Tenenbaum | 280/433 X |
| 2,976,051 | 3/1961 | Morey | 280/433 UX |
| 2,981,555 | 4/1961 | Abolins | 280/433 |
| 3,070,041 | 12/1962 | Gutridge | 280/433 UX |
| 3,082,020 | 4/1963 | Hulverson et al. | 280/433 |
| 3,254,904 | 6/1966 | Jewell | 280/433 |
| 3,770,296 | 11/1973 | Logan | 280/433 X |
| 3,791,674 | 2/1974 | Berends | 280/433 |
| 3,807,765 | 4/1974 | Pokornicki | 280/415 A X |

*Primary Examiner*—Joseph Paul Brust
*Attorney, Agent, or Firm*—Seidel, Gonda, Goldhammer & Panitch

[57] ABSTRACT

The king pin assembly is adapted to be mounted on a first vehicle for coupling said vehicle to a second vehicle. First and second king pins are integral in one piece with a common shaft and are 90° out of phase with each other. Each king pin when in its operative position is preloaded in a direction parallel to the axis of the shaft and is preloaded in a direction perpendicular to the axis of the shaft.

10 Claims, 13 Drawing Figures

VEHICLE KING PIN ASSEMBLY

BACKGROUND

Retractable and removable king pins are needed on vehicle trailers to accomodate different tractors and still meet the length, axial load, swing clearance, and other legal as well as operational limitations. King pins are also needed to facilitate transporting the vehicle trailer on flat bed railroad cars. The trailer hitch location on a flat bed railroad car has been set by the optimum dry cargo van geometry which limits the length of a refrigerated vehicle trailer. A typical flat bed railroad car has a length of 89 feet, 4 inches and will accomodate two trailer vehicles. If the trailer vehicles are refrigerated, their maximum length is only 41 feet, 4 inches. The present invention will enable such refrigerated trailers to have a length of 42 feet, 6 inches.

Existing retractable king pin designs require the king pin to have some play in its mounting. Under cyclic loading and vibratory conditions, this results in rapid wear of the mating surfaces and there is no take-up provision for such wear. The geometry of these designs is unsuitable to transmit the extremely high loads encountered when the vehicle trailers are mounted on a flat bed railroad car. Any prior king pin arrangements known to me which are sufficiently rigid so as to have the necessary strength under such conditions, have other disadvantages particularly in connection with the time and effort required to transfer from one king pin position to another.

For a pivotably mounted king pin having a cooperative latch, see U.S. Pat. Nos. 2,981,555 and 3,791,674. It is known to provide a pair of king pins connected together by way of a common shaft as taught by U.S. Pat. No. 2,831,704. It is known to provide a single king pin which is adjustable forward and aft as taught by U.S. Pat. Nos. 2,976,051 and 3,770,296.

SUMMARY OF THE INVENTION

The king pin assembly of the present invention is adapted to be mounted on a first vehicle for coupling said vehicle to a second vehicle. The assembly includes first and second king pins integral in one piece with a common shaft. The king pins are 90° out of phase with each other so that pivoting of such shaft about its longitudinal axis alternately moves the king pins between operative and inoperative positions. A first discrete means is provided for adjustably and alternately preloading each king pin in a direction parallel to the axis of said shaft when each king pin is in an operative position. A second discrete means is provided for adjustably preloading each king pin in a direction perpendicular to said axis when the king pin is in its operative position.

It is an object of the present invention to provide a king pin assembly which is constructed in a manner so as to eliminate play between the king pin and its mounting when the king pin is in its operative position.

It is another object of the present invention to provide a king pin assembly wherein two king pins are alternately positioned in an operative position and preloaded in mutually perpendicular directions while being constructed in a manner which does not require expensive precision manufacturing and at the same time provides for take-up adjustment resulting from operational wear.

It is another object of the present invention to provide a king pin assembly having first and second king pins alternately positioned in an operative position by means of a removable tool providing substantial mechanical advantage and rendering the adjustment of the king pins pilfer proof.

It is another object of the present invention to provide a king pin assembly which facilitates using longer refrigerated vehicle trailers on a standard flat bed railroad car.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
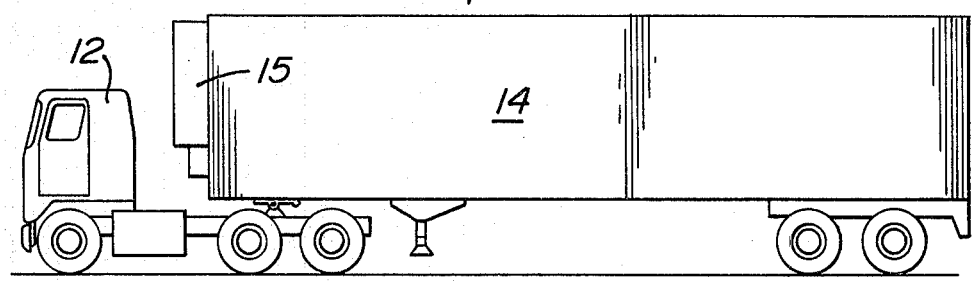
FIG. 1 is a side elevation view of a tractor and a refrigerated trailer for over the road usage.

Referring to the drawing in detail, wherein like numerals indicated like elements, there is shown in FIG. 1 a tractor trailer designated generally as 10 and arranged for over the road usage. A conventional tractor 12 is coupled to the trailer 14 by way of a conventional king pin assembly. The trailer 14 is of the refrigerated type with the refrigeration systems being designated 15.

Figure 2:
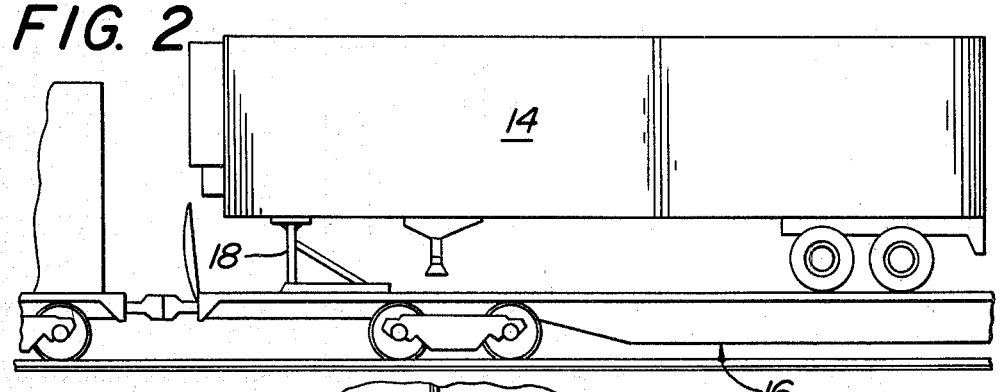
FIG. 2 is a partial side elevation view of a flat bed railroad car supporting the refrigerated trailer of FIG. 1.

As shown in FIG. 2, the trailer 14 may be transported by way of a flat bed railroad car 16. The king pin assembly on the bottom surface of the trailer 14 is coupled to hitch structure 18 on the car 16. Car 16 typically is of such a length such as 89 feet, 4 inches whereby it may accomodate two trailers 14. The distance between the two hitch structures 18 permits the total length of the trailers 14, if they are refrigerated, to a maximum length of 41 feet, 4 inches. The king pin assembly of the present invention includes two king pins which are alternately operative whereby the length of the refrigerated trailer 14 may be increased up to 42 feet, 6 inches. At the same time, the king pin assembly is designed in a manner whereby it is capable of absorbing the substantial shock loads imparted to it during over the rail transportation as well as having other advantages as disclosed herein.

Figure 3:
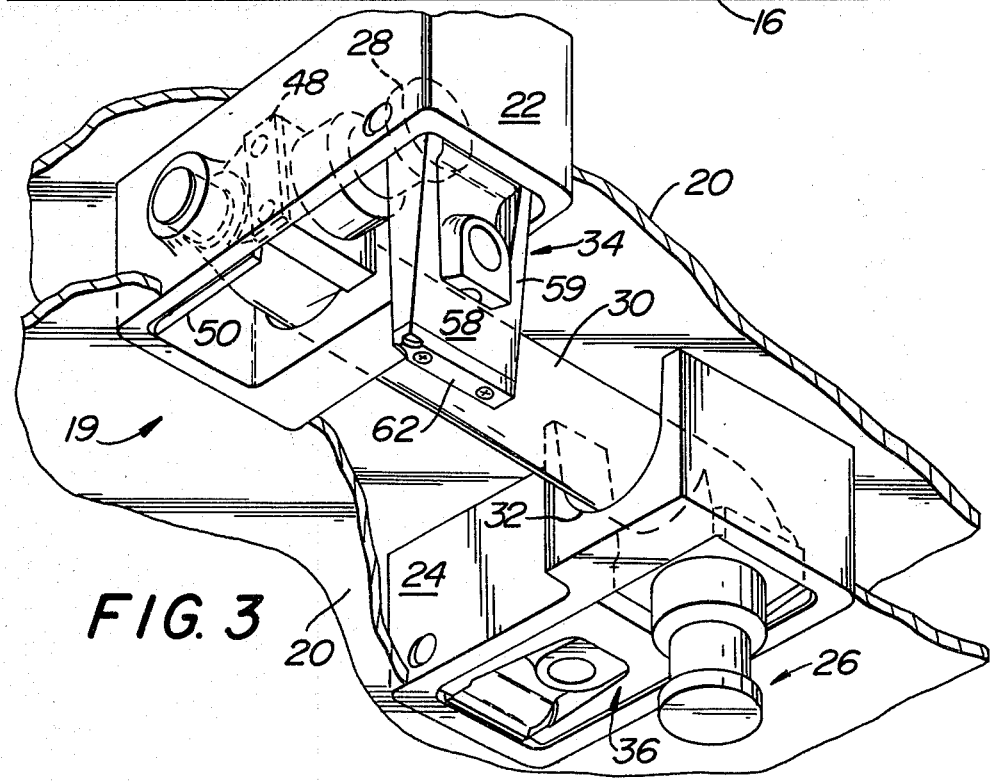
FIG. 3 is a partial perspective view of the bottom of the refrigerated trailer and showing the king pin assembly.

Referring to FIG. 3, a king pin assembly of the present invention is designated generally as 19 and is mounted between the bottom walls 20 of the trailer 14. The assembly 19 includes a pair of housings 22, 24 which are structurally interrelated with the ribbing, channels, and other reinforcment structure normally present between the bottom walls 20 of a trailer but not shown in FIG. 3. Assembly 19 includes king pins 26, 28 coupled together to a common shaft 30° and 90° out of phase with one another while being perpendicular to said shaft 30. Each of the housings 22, 24 has a V-shaped notch 32 through which the shaft 30 extends. Shaft 30 is supported at its ends by journals in housings 22, 24.

Each king pin is provided with a latch pivotable about an axis parallel to the longitudinal axis of the shaft 30. Thus, king pin 28 is provided with a latch 34 and king pin 26 is provided with a latch 36. The latches are structurally interrelated with the housings and their associated king pins so as to preload their associated king pin in a direction perpendicular to the longitudinal axis of shaft 30 as will be described hereinafter.

In FIGS. 4–8, there is diagramatically illustrated a sequence of manipulative steps for moving the king pins between their operative and inoperative positions. Such manipulation requires a specially designed discrete portable handle 38 which remains with the driver or with a trainman whereby the king pin assembly is tamper proof. Handle 30 has a U-shaped jaw 40 at one end and a tapered end portion 42 at its other end.

Figure 4:
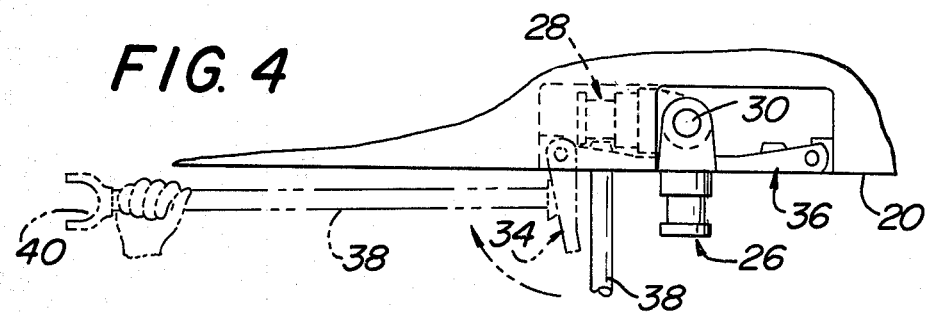
FIGS. 4-8 are diagramatic illustrations showing the sequential steps in manipulating the king pin assembly from one operative position to another operative position.
Figure 5:
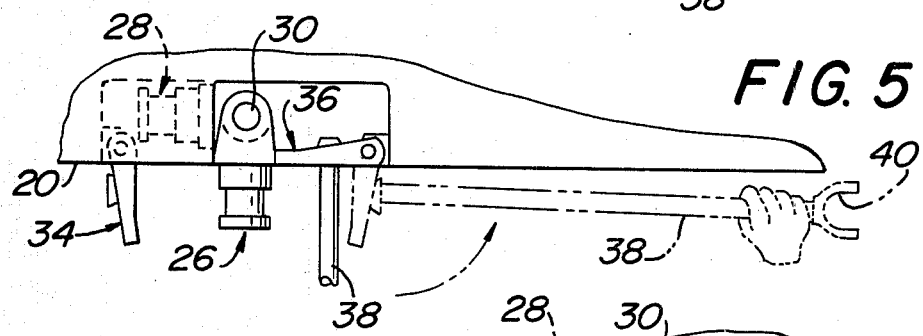
Figure 6:
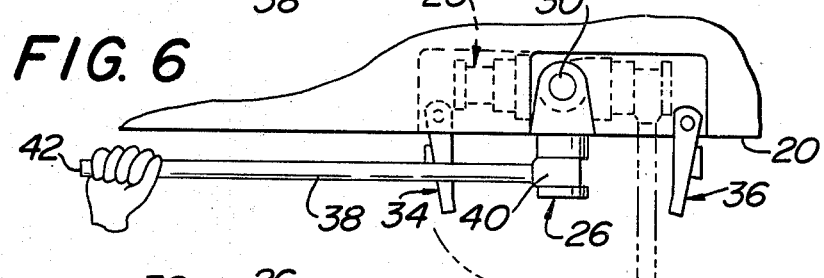
Figure 7:
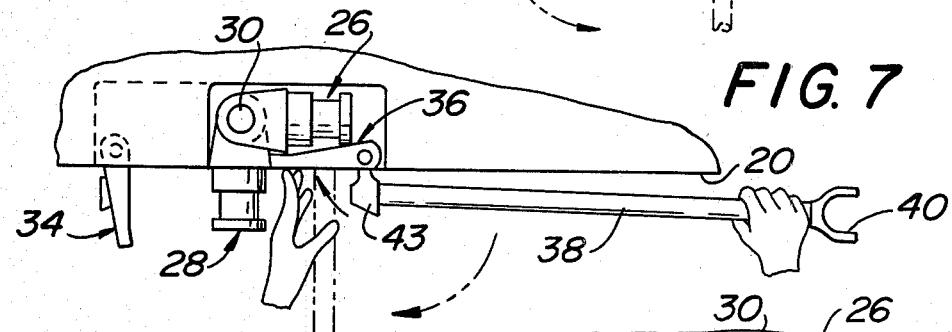
Figure 8:
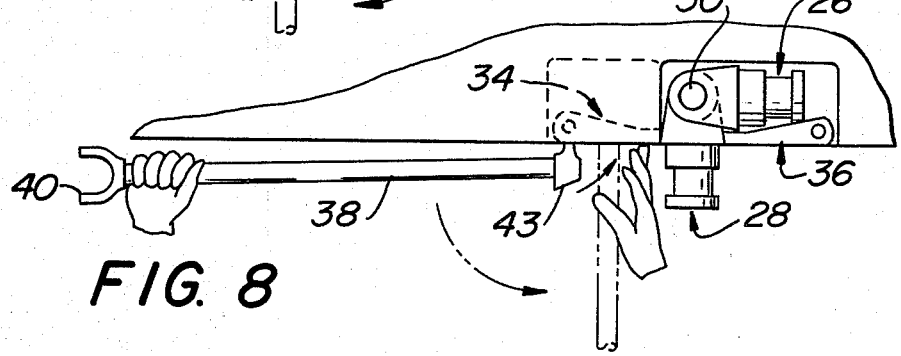

In FIG. 4, the king pin 26 is in its operative position and king pin 28 is in its inoperative position. In order to reverse the positions of the king pins, shaft 30 must be rotated 90° in a counterclockwise direction in FIG. 4. The first step is to use the tapered end portion 42 of tool 38 to pivot the latch 34 associated with king pin 28 to its inoperative position. This is accomplished by swinging the handle 38 from the solid line position to the phantom position shown in FIG. 4. Next, the handle 38 is utilized in a similar manner to pivot the latch 36 from its operative position to an inoperative position as shown in phantom in FIG. 5. Next, handle 38 is positioned so that jaw 40 embraces king pin 26 and the handle is thereafter swung from the solid line position to the phantom position as shown in FIG. 6. This causes the king pin 26 to move to its inoperative position while simultaneously moving the king pin 28 to its operative position as shown in FIG. 7. Thereafter, the latch 36 is manually held in an operative position as shown in FIG. 7 while tool 38 is engaged with the gate 43 on the latch 36. Thereafter, the handle 38 is rotated from the solid line position to the phantom position in FIG. 7. In a like manner, the latch 34 and its gate are moved to an operative position as shown in FIG. 8 to preload the king pin 28 in a direction perpendicular to the axis of shaft 30. This completes the changeover of the king pin assembly 19 from one king pin to another whereby the distance from the operative king pin to the front end of the trailer 14 may be changed. Further details of the latches will be described hereinafter.

Figure 10:
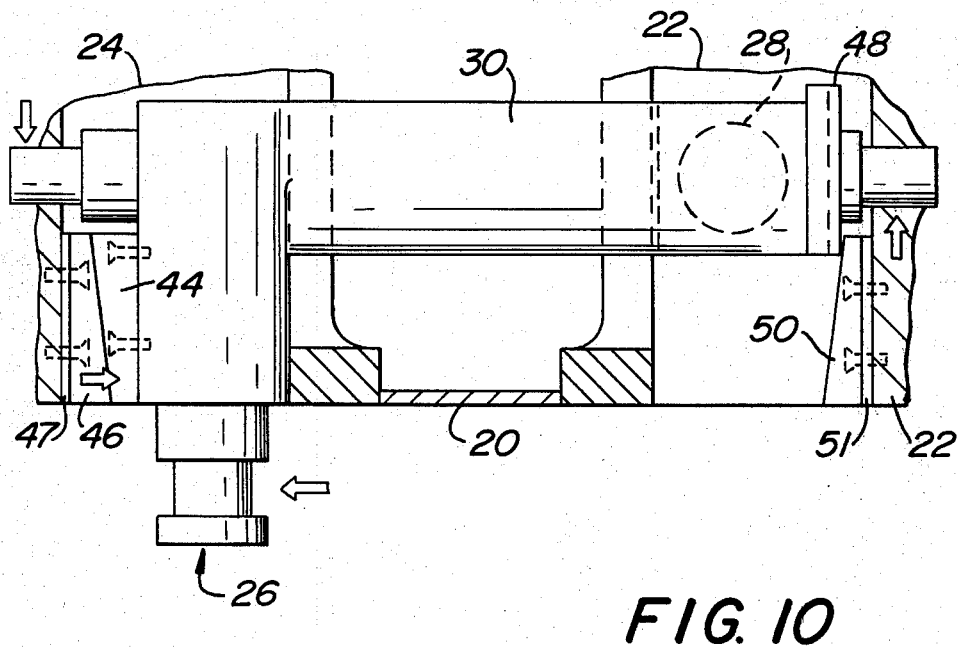
FIG. 10 is a diagramatic sectional view showing the structure for preloading a king pin in a direction parallel to the axis of the common shaft when the king pin is in its operative position.

Referring to FIG. 10, there is illustrated a means for automatically preloading the operative king pin in a direction parallel to the longitudinal axis of shaft 30. This is accomplished by using a cam 44 on a side face of the king pin 26 which is adapted to mate with a cam 46 fixedly secured to the housing 24. A readily replaceable shim 47 is provided between cam 46 and housing 24. When the cams 44, 46 are in mating engagement, a cam 48 on the side face of king pin 28 is 90° out of engagement with cam 50. Cam 50 is fixedly secured to the housing 22 and spaced therefrom by a replaceable shim 51. The shims 47, 51 facilitate a means whereby they may be replaced as a function of wear on the king pins.

As described above, the manner in which the king pins are preloaded in an axial direction is identical. Likewise, the manner in which the king pins are preloaded in a direction perpendicular to the longitudinal axis of the common shaft 30 is identical. Hence, only preloading of king pin 28 will be described in detail.

Figure 11:
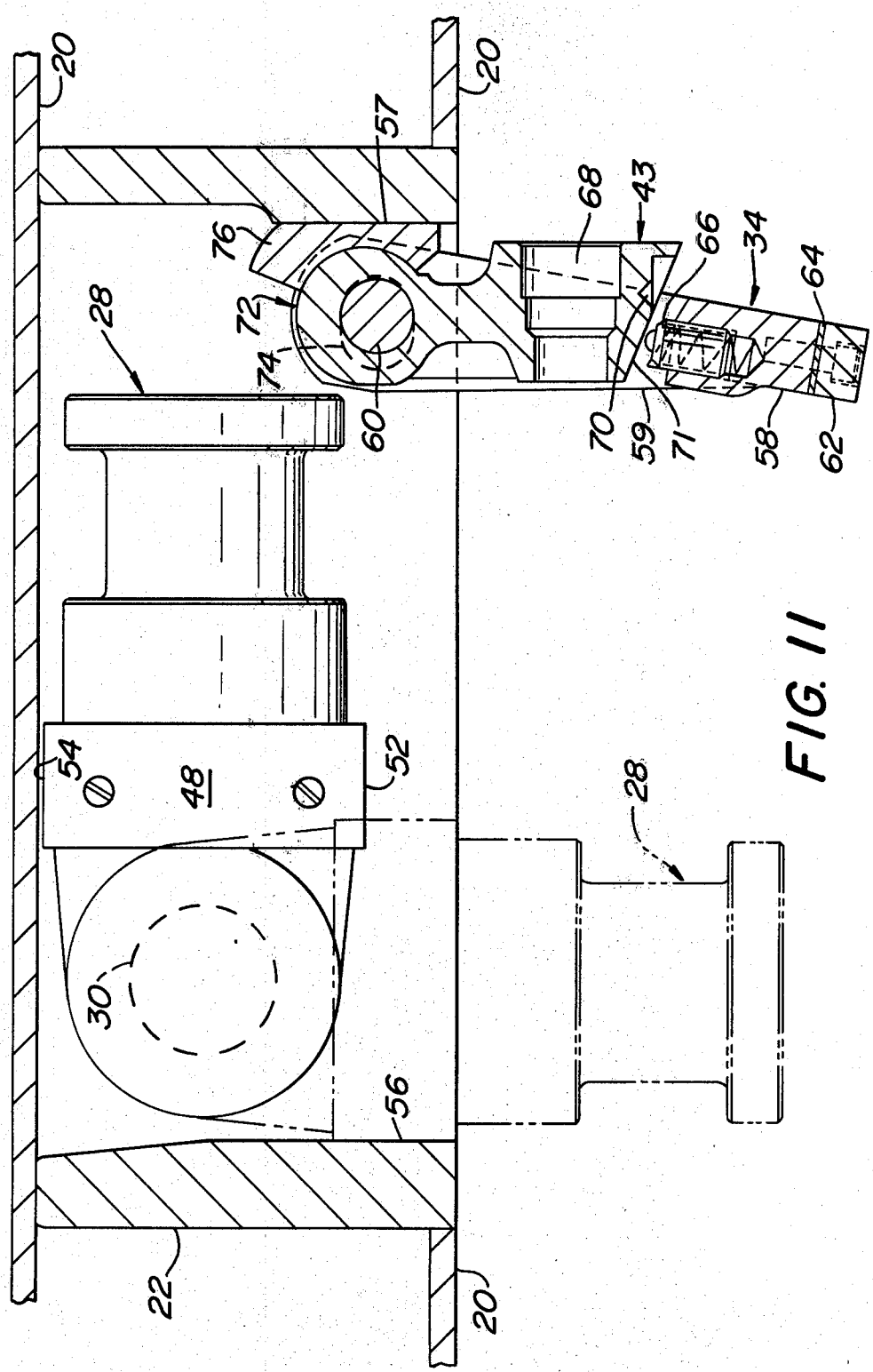
FIGS. 11-13 are sectional views for sequentially showing steps of preloading a king pin in a direction perpendicular to the common shaft while the king pin is in its operative position.

Referring to FIG. 11, it will be noted that the king pin 28 has flats 52 and 54 on opposite faces thereof. The inner surface of the housing 22 has flats 56, 57 on opposite end walls. The flats 56, 57 extend downwardly to the lower surface of the housing 22. Flat 52 is adapted to be in intimate contact with the flat 56 when the king pin 28 is in an operative disposition. In this regard, see FIG. 12.

Figure 12:
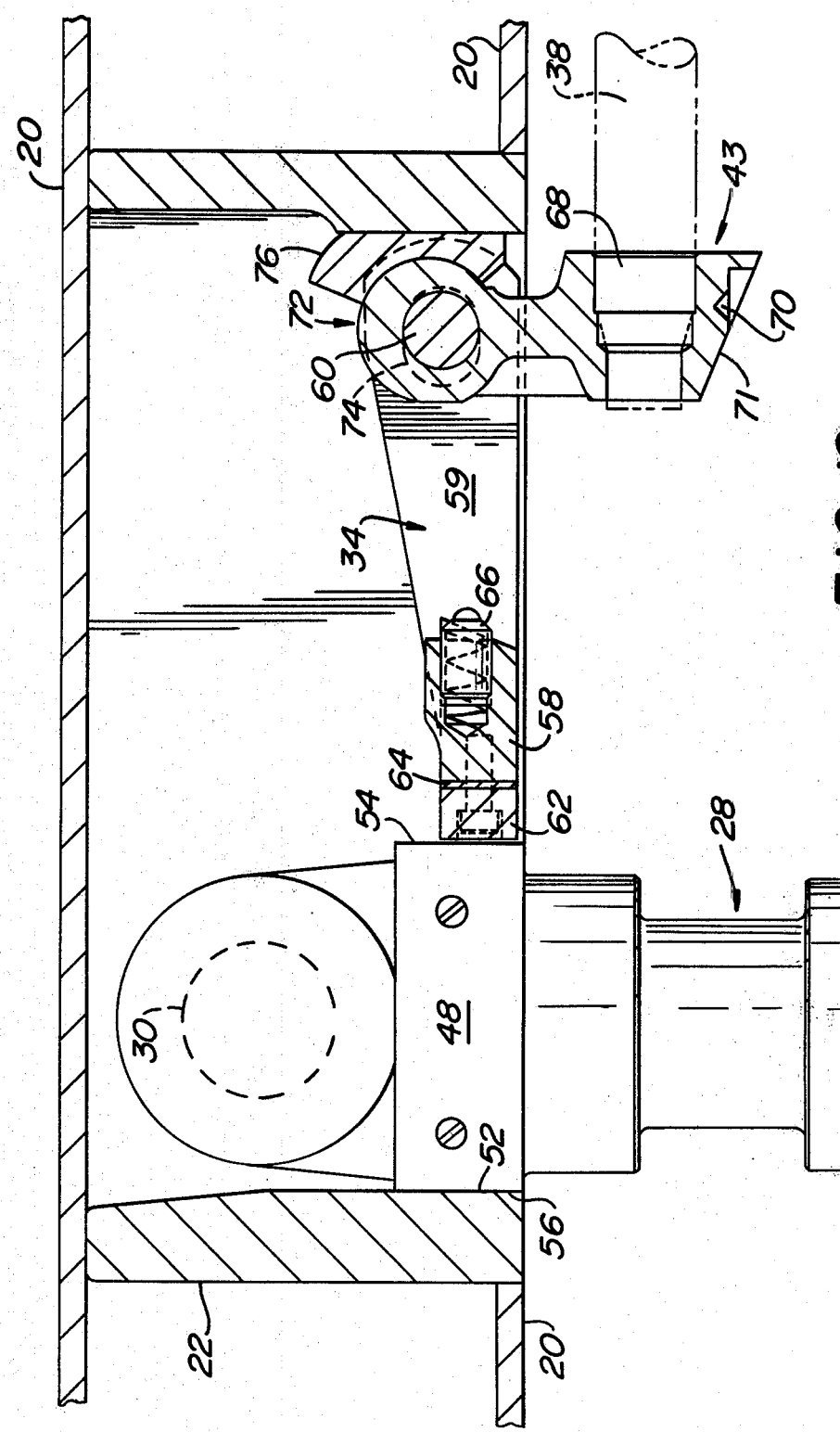

Referring to FIG. 12, with flats 52 and 56 in intimate contact, the latch 34 is manually moved and held as shown in FIG. 12. The gate 43 is moved from the position shown in FIG. 12 to the position shown in FIG. 13 by way of the handle 38 as described above. Referring to FIGS. 3, 11 and 12, it will be noted that the latch 34 includes a clevis 58 having legs 59. The legs 59 are pivotably mounted on pin 60 adjacent their free ends. The ends of pin 60 are supported by the housing 22 within horizontally elongated slots 74 in the housing 22.

A piston 62 is removably bolted to the end face of the clevis 58 with a shim 64 therebetween. Shim 64 may be removed and replaced to compensate for wear during usage. Between the legs 59, the clevis 58 has a spring biased detent 66. The gate 43 has an opening 68 for receiving the tapered end 42 of the handle 38 and is pivotably mounted on pin 60 between the legs 59 of the clevis 58. On its bevelled end face 71, the gate 58 has a detent recess 70.

Referring to FIG. 11, the portion of the gate 43 above the elevation of the pin 60 is provided with an arcuate surface 72. The center of curvature of surface 72 is eccentric with respect to the axis of rotation of pin 60. A portion of surface 72 is in contact with a mating curved surface on a sliding block 76. Block 76 is in contact with the flat 57.

Figure 13:
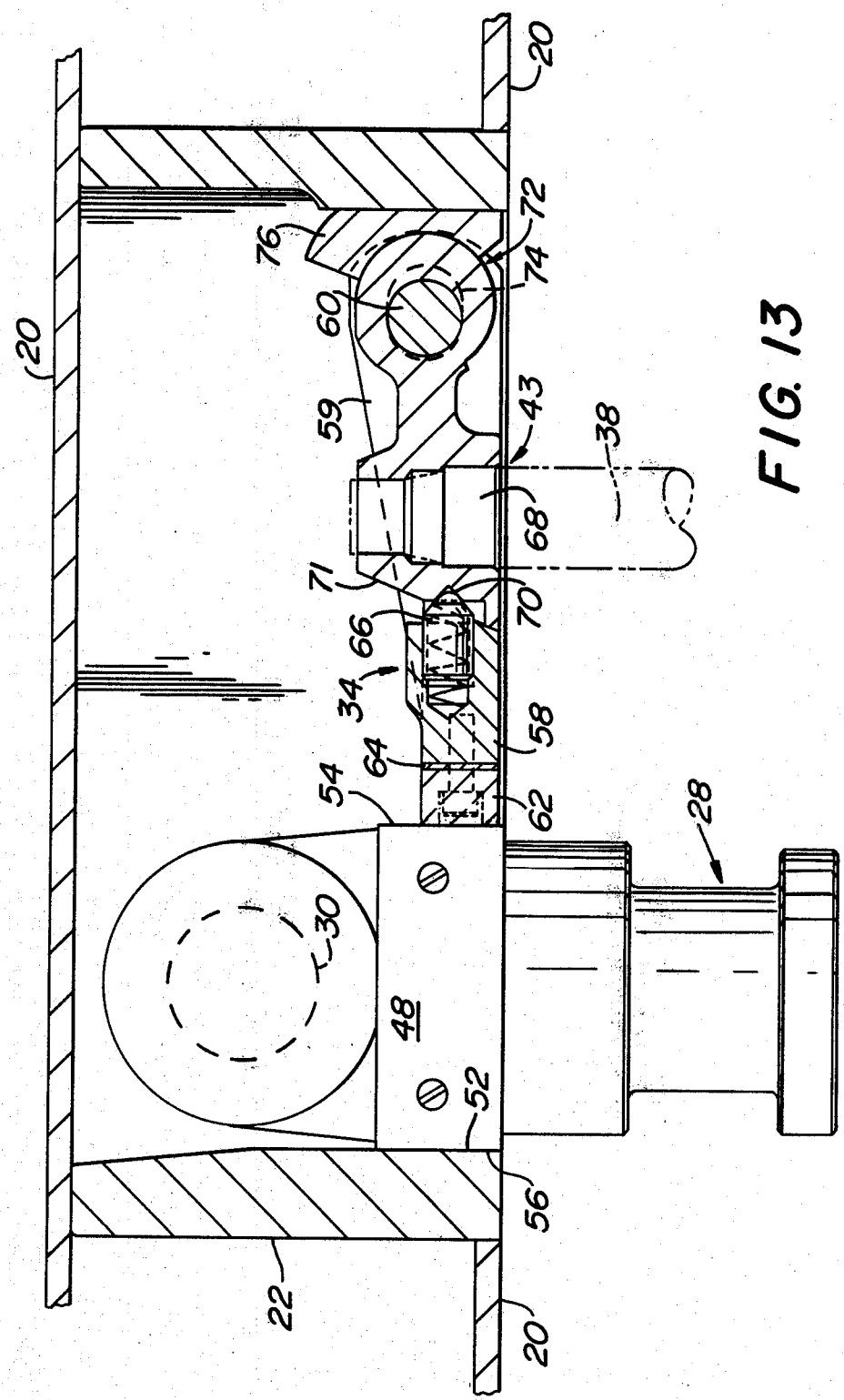

When the gate 43 is moved from the position shown in FIG. 12 to the position shown in FIG. 13, the following occur. Surface 72 causes the block 76 to slide downwardly thereby pushing the entire assembly from right to left in FIG. 13 so that pin 60 is at the opposite end of the slot 74. In doing so, the piston 62 moves from right to left and preloads the king pin 28 due to contact with the flat 54 in a direction which is perpendicular to the longitudinal axis of the shaft 30. The preload force is at an elevation between the elevation of shaft 30 and adjacent the lower end of housing 22. As a result thereof there is a smaller bending moment applied to the king pin 28 as compared with the bending moments in prior art devices. The preload of the king pin 28 is in part accomplished by a latch 34 which performs the additional function of preventing entry of dust and other foreign matter into the space occupied by the king pin 28 when the latter is in its inoperative position.

Figure 9:
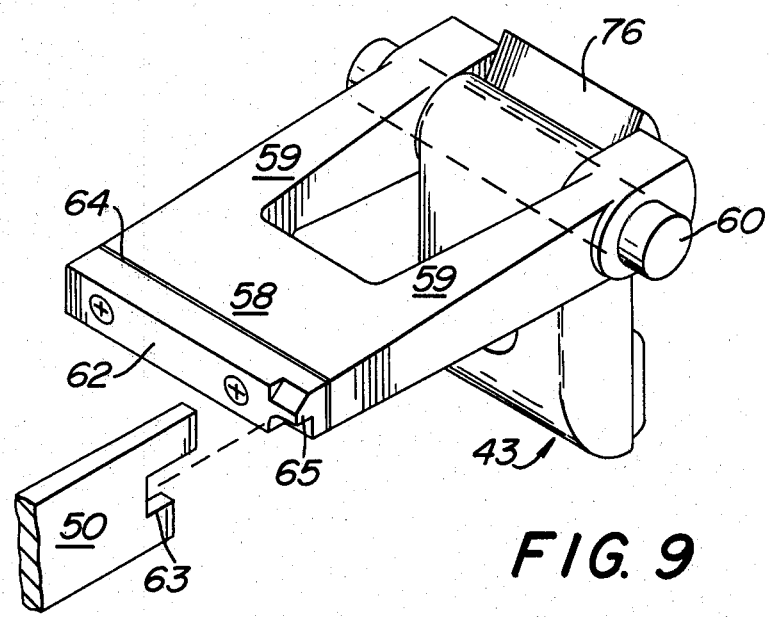
FIG. 9 is a perspective view of the latch associated with one of the king pins.

The present invention as described above and illustrated in the drawings eliminates any play between the king pin 28 and its mounting while using a preload mechanism having a high mechanical advantage. The cam 50 has a notch 63 which receives a projection 65 on the piston 62 as the piston 62 moves horizontally under the preload pressure. See FIG. 9. The cooperative relationship between piston 62 and the cam 50 prevents the latch 34 from moving to an open disposition as a result of vibration. The vertical distance between the front to aft loads on a king pin in its operative position, as represented by the arrows in FIG. 10, is less than that of prior art devices whereby vertical loads on the king pins are substantially less. Thus, it will be seen that the novel structural interrelationship of the king pin assembly attains its objects and advantages in a manner which is simple and reliable.

The present invention may be embodied in other specific forms without departing from the spirit or essential attributes thereof and, accordingly, reference should be made to the appended claims, rather than to the foregoing specification, as indicating the scope of the invention.

I claim:

1. A king pin assembly adapted to be mounted on a first vehicle for coupling said vehicle to a second vehicle comprising first and second king pins integral in one piece with a common shaft, said king pins being 90° out of phase with each other so that pivoting of said shaft about its longitudinal axis alternately moves the king pins between operative and inoperative positions, a discrete first cam means for adjustably and alternately preloading each king pin in a direction parallel to said axis when each king pin is in its operative position, a discrete second cam means for adjustably preloading each king pin in a direction perpendicular to said axis when each king pin is in its operative position whereby the king pins in an operative position are preloaded in mutually perpendicular planes.

2. An assembly in accordance with claim 1 wherein said first cam means includes a discrete cam moveable as a unit with each king pin and cooperating with a cam attached to a housing which rotatably supports one end of said shaft.

3. An assembly in accordance with claim 1 wherein said second cam means includes a discrete latch associated with each king pin, each latch being pivotably mounted for movement about an axis parallel to longitudinal axis of said shaft, each latch being positioned so as to be disposed below an associated king pin disposed in its inoperative position.

4. An assembly in accordance with claim 1 including a housing having a flat on its inner surface extending downwardly to its lower most edge for contact with a flat on a face of a king pin when the latter is in its operative position.

5. An assembly in accordance with claim 1 wherein said second cam means includes a pivotably mounted latch which moves horizontally as it rotates about an axis parallel to the longitudinal axis of said shaft.

6. An assembly in accordance with claim 1 including a discrete tool having one end shaped to mate with a surface on each king pin, said tool having its other end shaped to mate with a discrete latch associated with each king pin whereby manipulation of the king pins and latches may be attained using the mechanical advantage resulting from the length of said tool.

7. A king pin assembly adapted to be mounted on a first vehicle for coupling said vehicle to a second vehicle comprising first and second king pins integral in one piece with a common shaft, said king pins being 90° out of phase with each other so that pivoting of said shaft about its longitudinal axis alternately moves the king pins between operative and inoperative positions, a discrete first means including a pair of cams for alternately preloading each king pin in a direction parallel to said axis when each king pin is in its operative position, a discrete second means at about the same elevation as said first means for preloading each king pin in a direction perpendicular to said axis when each king pin is in its operative position whereby the king pins in an operative position are preloaded in mutually perpendicular planes at about the same elevation.

8. An assembly in accordance with claim 7 wherein said pair of cams include a discrete cam moveable as a unit with each king pin and cooperating with a cam attached to a housing which rotatably supports one end of said shaft.

9. An assembly in accordance with claim 8 wherein said second preload means includes a discrete latch associated with each king pin, each latch being pivotably mounted for movement about an axis parallel to the longitudinal axis of said shaft, each latch being positioned so as to be horizontally disposed below an associated king pin disposed in its inoperative position.

10. An assembly in accordance with claim 9 including a removable shim associated with each pair of cams, and a removable shim associated with each latch.

* * * * *